US010547599B1

(12) United States Patent
Mehta et al.

(10) Patent No.: US 10,547,599 B1
(45) Date of Patent: Jan. 28, 2020

(54) MULTI-FACTOR AUTHENTICATION FOR MANAGED DIRECTORIES

(71) Applicant: Amazon Technologies, Inc., Seattle, WA (US)

(72) Inventors: Gaurang Pankaj Mehta, Seattle, WA (US); Sameer Palande, Seattle, WA (US); Lawrence Hun-Gi Aung, Seattle, WA (US); Raghavendra Reddy Madakkagari, Seattle, WA (US); Shuo Wang, Bellevue, WA (US); Salman Aftab Paracha, Redmond, WA (US); Chirag Pravin Pandya, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/626,843

(22) Filed: Feb. 19, 2015

(51) Int. Cl.
*H04L 29/06* (2006.01)

(52) U.S. Cl.
CPC .......... *H04L 63/08* (2013.01); *H04L 63/0838* (2013.01)

(58) Field of Classification Search
CPC . H04L 63/0838; H04L 63/0846; H04L 63/08; H04L 63/083; H04L 63/18; H04L 2463/082; H04L 61/15; H04L 61/1505; H04L 9/3226; H04L 9/3228; H04L 9/3234; H04L 9/0827
See application file for complete search history.

(56) References Cited

U.S. PATENT DOCUMENTS

| 7,739,744 | B2 * | 6/2010 | Burch | G06F 21/31 726/26 |
| 8,572,711 | B1 * | 10/2013 | Klau | H04L 63/0807 726/29 |
| 9,047,473 | B2 * | 6/2015 | Samuelsson | H04L 9/321 |
| 9,118,656 | B2 * | 8/2015 | Ting | H04L 63/104 |
| 9,191,381 | B1 * | 11/2015 | Popp | G06F 21/34 |
| 9,313,193 | B1 * | 4/2016 | Mehta | G06F 16/24 |
| 9,402,181 | B1 * | 7/2016 | Yi | H04W 12/06 |

(Continued)

OTHER PUBLICATIONS

"Multifactor Authentication," Okta, <https://www.okta.com/product/identity-management/multifactor-authentication.html> [retrieved Feb. 20, 2015], 3 pages.

(Continued)

*Primary Examiner* — Nelson S. Giddins
(74) *Attorney, Agent, or Firm* — Davis Wright Tremaine LLP

(57) ABSTRACT

A user transmits a request to an authentication service to access a managed directory. The request may include a first set of credentials usable by a managed directory service to authenticate the user. As a result of the first set of credentials being valid, the authentication service may prompt the user to provide a multi-factor authentication code, which may be used by an authentication server to further authenticate the user and enable the user to access the managed directory. The authentication service subsequently provides the multi-factor authentication code to the authentication server for validation. If the multi-factor authentication code is valid, the authentication service may enable the user to access the managed directory through an encrypted communications session.

20 Claims, 9 Drawing Sheets

(56) References Cited

U.S. PATENT DOCUMENTS

| | | | |
|---|---|---|---|
| 9,646,309 B2* | 5/2017 | Goldschlag | H04L 63/20 |
| 9,853,977 B1* | 12/2017 | Laucius | H04L 63/0884 |
| 2002/0023220 A1* | 2/2002 | Kaplan | H04L 63/0823 |
| | | | 713/176 |
| 2003/0051041 A1* | 3/2003 | Kalavade | G06Q 20/14 |
| | | | 709/229 |
| 2004/0133679 A1* | 7/2004 | Kennis | H04L 12/4633 |
| | | | 709/225 |
| 2006/0123472 A1* | 6/2006 | Schmidt | G06F 21/41 |
| | | | 726/8 |
| 2007/0186099 A1* | 8/2007 | Beck | G06F 21/34 |
| | | | 713/159 |
| 2007/0186106 A1* | 8/2007 | Ting | H04L 63/0815 |
| | | | 713/168 |
| 2007/0199059 A1* | 8/2007 | Takehi | G06F 21/31 |
| | | | 726/10 |
| 2007/0240203 A1* | 10/2007 | Beck | G06F 21/33 |
| | | | 726/4 |
| 2008/0028445 A1* | 1/2008 | Dubuc | H04L 63/08 |
| | | | 726/5 |
| 2008/0072283 A1* | 3/2008 | Relyea | G06F 21/31 |
| | | | 726/2 |
| 2008/0222696 A1* | 9/2008 | Nicodemus | H04L 63/083 |
| | | | 726/1 |
| 2008/0263652 A1* | 10/2008 | McMurtry | G06F 21/335 |
| | | | 726/9 |
| 2009/0126002 A1* | 5/2009 | Vail | H04L 63/0209 |
| | | | 726/12 |
| 2009/0133109 A1* | 5/2009 | Giles | H04L 63/08 |
| | | | 726/7 |
| 2010/0107225 A1* | 4/2010 | Spencer | H04L 63/0876 |
| | | | 726/4 |
| 2010/0299731 A1* | 11/2010 | Atkinson | G06F 21/42 |
| | | | 726/6 |
| 2012/0023546 A1* | 1/2012 | Kartha | H04L 63/104 |
| | | | 726/1 |
| 2012/0144461 A1* | 6/2012 | Rathbun | H04L 9/3213 |
| | | | 726/5 |
| 2012/0222099 A1* | 8/2012 | Narendra | H04L 63/0853 |
| | | | 726/6 |
| 2013/0024925 A1* | 1/2013 | Venkataramani | H04L 63/083 |
| | | | 726/7 |
| 2013/0061310 A1* | 3/2013 | Whitmyer, Jr. | H04L 63/0281 |
| | | | 726/9 |
| 2013/0127591 A1* | 5/2013 | Shay | G07C 9/00087 |
| | | | 340/5.52 |
| 2013/0185767 A1* | 7/2013 | Tirupachur Comerica | H04L 9/321 |
| | | | 726/4 |
| 2013/0212387 A1* | 8/2013 | Oberheide | H04L 63/08 |
| | | | 713/168 |
| 2013/0212653 A1* | 8/2013 | Hoghaug | G06F 21/34 |
| | | | 726/5 |
| 2013/0297933 A1* | 11/2013 | Fiducia | H04L 63/0853 |
| | | | 713/156 |
| 2014/0047510 A1* | 2/2014 | Belton | H04L 9/32 |
| | | | 726/4 |
| 2014/0245389 A1* | 8/2014 | Oberheide | H04L 63/0815 |
| | | | 726/3 |
| 2014/0245396 A1* | 8/2014 | Oberheide | H04L 63/08 |
| | | | 726/4 |
| 2014/0282964 A1* | 9/2014 | Stubblefield | H04L 63/0853 |
| | | | 726/7 |
| 2014/0282989 A1* | 9/2014 | Young | H04L 63/08 |
| | | | 726/9 |
| 2015/0058959 A1* | 2/2015 | Gordon | G06F 21/31 |
| | | | 726/7 |
| 2015/0067793 A1* | 3/2015 | Robison, Jr. | H04L 63/0838 |
| | | | 726/5 |
| 2015/0163222 A1* | 6/2015 | Pal | H04L 63/0807 |
| | | | 713/168 |
| 2015/0227732 A1* | 8/2015 | Doctor | G06F 21/31 |
| | | | 726/4 |
| 2015/0237049 A1* | 8/2015 | Grajek | H04L 63/0815 |
| | | | 726/7 |
| 2015/0244706 A1* | 8/2015 | Grajek | H04L 63/0815 |
| | | | 726/6 |
| 2015/0281225 A1* | 10/2015 | Schoen | H04L 63/06 |
| | | | 726/9 |
| 2015/0334564 A1* | 11/2015 | McClure | G06F 21/40 |
| | | | 726/7 |
| 2015/0365405 A1* | 12/2015 | Kalinichenko | G06F 21/43 |
| | | | 726/3 |
| 2016/0065579 A1* | 3/2016 | Chen | G06F 21/43 |
| | | | 726/4 |
| 2016/0099924 A1* | 4/2016 | Mehta | H04L 61/1552 |
| | | | 726/7 |
| 2016/0205108 A1* | 7/2016 | Si | H04L 63/102 |
| | | | 726/4 |
| 2016/0212113 A1* | 7/2016 | Banerjee | H04L 63/083 |
| 2016/0301679 A1* | 10/2016 | Mortimore, Jr. | H04L 63/083 |
| 2016/0307161 A1* | 10/2016 | Hentschel | G06Q 10/1057 |
| 2017/0111351 A1* | 4/2017 | Grajek | H04W 12/06 |
| 2018/0007059 A1* | 1/2018 | Innes | G06F 21/33 |
| 2019/0036915 A1* | 1/2019 | Burch | H04L 63/0838 |

OTHER PUBLICATIONS

"Multi-Factor Authentication," Ping Identity, <https://www.pingidentity.com/en/products/capabilities/multi-factor-authentication.html> [retrieved Feb. 20, 2015], 2 pages.

Dierks, T., et al., "The TLS Protocol Version 1.0," Request for Comments: 2246, Standards Track, Jan. 1999, 75 pages.

Newman, C., "Using TLS with IMAP, POP3 and ACAP," Request for Comments: 2595, Standards Track, Jun. 1999, 16 pages.

Medvinsky, A., et al., "Addition of Kerberos Cipher Suites to Transport Layer Security (TLS)," Request for Comments: 2712, Standards Track, Oct. 1999, 7 pages.

Khare, R., et al., "Upgrading to TLS Within HTTP/1.1," Request for Comments: 2817, Standards Track, May 2000, 13 pages.

Rescorla, E., "HTTP Over TLS," Request for Comments: 2818, Informational, May 2000, 8 pages.

Hoffman, P., "SMTP Service Extension for Secure SMTP over Transport Layer Security," Request for Comments: 3207, Standards Track, Feb. 2002, 9 pages.

Chown, P., "Advanced Encryption Standard (AES) Ciphersuites for Transport Layer Security (TLS)," Request for Comments: 3268, Standards Track, Jun. 2002, 8 pages.

Blake-Wilson, S., et al., "Transport Layer Security (TLS) Extensions," Request for Comments: 3546, Standards Track, Jun. 2003, 28 pages.

Hollenbeck, S., "Transport Layer Security Protocol Compression Methods," Request for Comments: 3749, Standards Track, May 2004, 8 pages.

Friend, R., "Transport Layer Security (TLS) Protocol Compression Using Lempel-Ziv-Stac (LZS)," Request for Comments: 3943, Informational, Nov. 2004, 13 pages.

Moriai, S., et al., "Addition of Camellia Cipher Suites to Transport Layer Security (TLS)," Request for Comments: 4132, Standards Track, Jul. 2005, 8 pages.

Lee, H.J., et al., "Addition of SEED Cipher Suites to Transport Layer Security (TLS)," Request for Comments: 4162, Standards Track, Aug. 2005, 7 pages.

Ford-Hutchinson, P., "Securing FTP with TLS," Request for Comments: 4217, Standards Track, Oct. 2005, 29 pages.

Eronen, P., and H. Tschofenig, "Pre-Shared Key Ciphersuites for Transport Layer Security (TLS)," Request for Comments: 4279, Standards Track, Dec. 2005, 16 pages.

Rescorla, E., and N. Modadugu, "Datagram Transport Layer Security," Request for Comments: 4347, Standards Track, Apr. 2006, 26 pages.

Blake-Wilson, S., et al., "Transport Layer Security (TLS) Extensions," Request for Comments: 4366, Standards Track, Apr. 2006, 29 pages.

(56) References Cited

OTHER PUBLICATIONS

Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Tuexen, M., et al., "Datagram Transport Layer Security (DTLS) for Stream Control Transmission Protocol (SCTP)," Request for Comments: 6083, Standards Track, Jan. 2011, 10 pages.
Eastlake, D., "Transport Layer Security (TLS) Extensions: Extension Definitions," Request for Comments: 6066, Standards Track, Jan. 2011, 25 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Kim, W., et al., "Addition of the ARIA Cipher Suites to Transport Layer Security (TLS)," Request for Comments: 6209, Informational, Apr. 2011, 10 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
McGrew, D., and D. Bailey, "AES-CCM Cipher Suites for Transport Layer Security (TLS)," Request for Comments: 6655, Standards Track, Jul. 2012, 8 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.

\* cited by examiner

| Manage Access | Multi-Factor Authentication | Managed Directory Account |

Multi-Factor Authentication

Enable Multi-Factor Authentication to your On-Premises Managed Directory

Enable Multi-Factor Authentication? ☒ ENABLED — 402

| | |
|---|---|
| RADIUS Server Status | Not Connected — 404 |
| RADIUS Server Address(es) | 192.0.2.24 — 406 |
| Port | 1812 — 408 |
| Shared Secret Code | CyFH34 — 410 |
| Confirm Shared Secret Code | CyFH34 — 412 |
| Protocol | CHAP — 414 |
| Server Timeout (in seconds) | 60 — 416 |
| Max Entries | 3 — 418 |

[ Update ] — 420

MULTI-FACTOR AUTHENTICATION FOR MANAGED DIRECTORIES

BACKGROUND

Customers utilize directory services to create and maintain a directory (e.g., file systems, files, users, security policies, network resources, applications, system storage, etc.) for data management and, generally, access to a variety of resources. The directory service may be configured to create a directory in a data center operated by the customer (e.g., on-premises) or in a remote network (e.g., off-premises), dependent on the customer's business needs. These directories may be utilized to provision one or more computing resources within an off-premises network. However, since these computing resources may reside in an off-premises network, it may be desirable to augment existing on-premises authentication methods with additional security layers to enhance the security of these computing resources and the directory, whether operated by the customer or in the off-premises network.

BRIEF DESCRIPTION OF THE DRAWINGS

Various embodiments in accordance with the present disclosure will be described with reference to the drawings, in which:

FIG. 4 shows an illustrative example of an interface for enabling and configuring multi-factor authentication for a managed directory in accordance with at least one embodiment;

DETAILED DESCRIPTION

Figure 1:
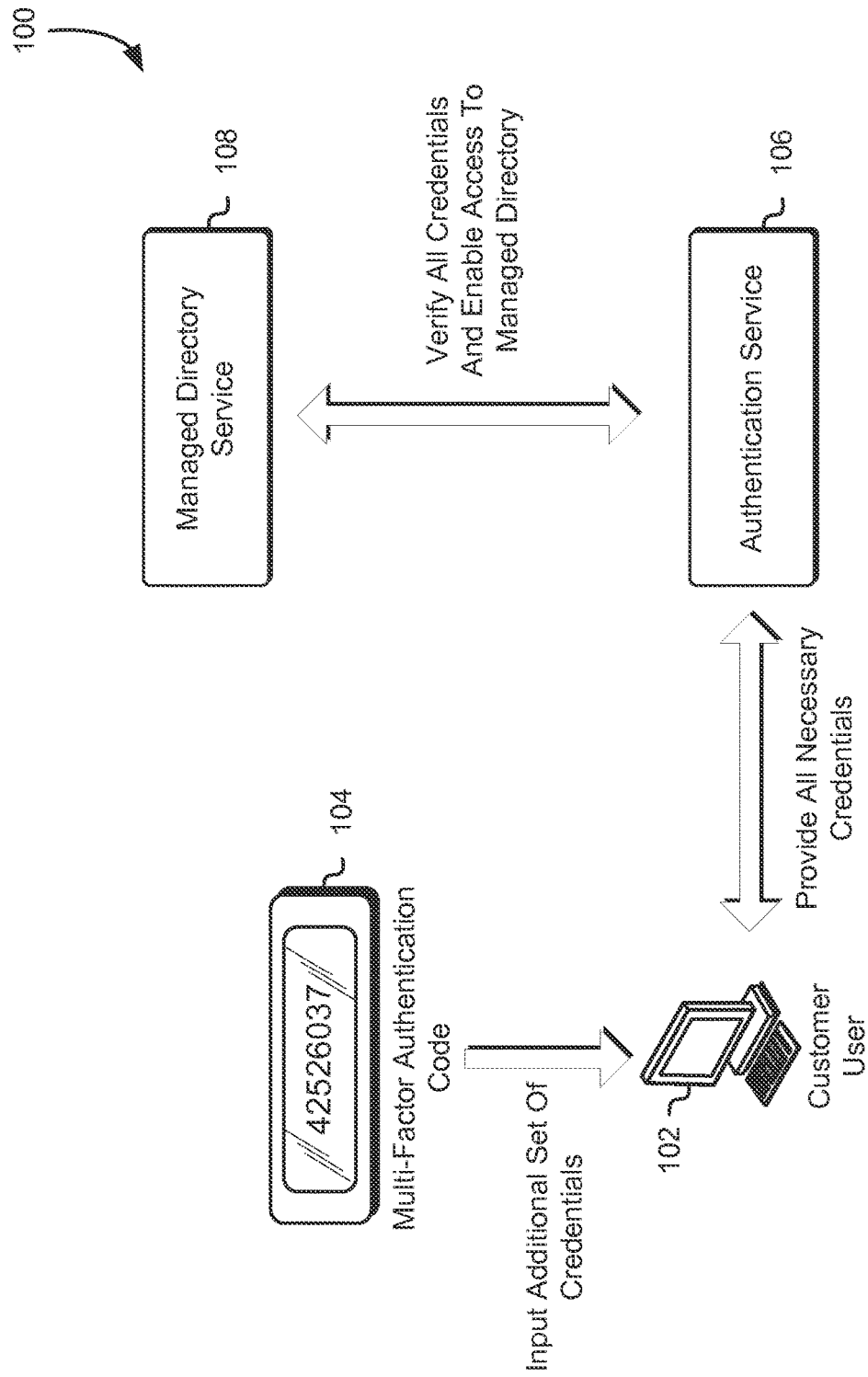
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the enablement and use of multi-factor authentication for managed directories. In an embodiment, an administrator of an on-premises customer (e.g., organization) network communicates, through an interface, with a managed directory service to enable multi-factor authentication for a particular managed directory. The managed directory may be managed remotely by the managed directory service or by the administrator or other processes/services within the on-premises customer network. The administrator, through the interface, may specify an Internet Protocol (IP) address and other configuration information of a Remote Authentication Dial In User Service (RADIUS) server within the customer network or that is managed by the managed directory service that may be utilized to authenticate a user of the managed directory. The administrator may further establish a multi-factor authentication code that may be used by the RADIUS server to authenticate the potential users of the managed directory, which a user may utilize in addition to a standard set of domain credentials for accessing the managed directory.

Once the administrator has enabled multi-factor authentication for a particular managed directory, a user may be required to provide the set of domain credentials, as well as the multi-factor authentication code to access the managed directory. For instance, a user may access an authentication service, which may be associated with the managed directory service, to access the managed directory. If the managed directory is directly managed and maintained by a managed directory service, the authentication service may provide the user's set of credentials to the managed directory service and the multi-factor authentication code and the shared secret needed to establish secure communications with a RADIUS server to the RADIUS server operating on behalf of the managed directory service (e.g., off-premises). In an embodiment, the authentication service initially only enables the user to provide his/her set of credentials for verification. If the authentication service determines, based on an analysis of the set of credentials by the managed directory service, that the set of credentials are not valid, the authentication service may, after a delay, prompt the user to provide his/her multi-factor authentication code. Once the multi-factor authentication code has been provided, the authentication service may deny the request from the user to access the managed directory. If the user's set of credentials are valid, the authentication service may prompt the user for his/her multi-factor authentication code and provide the multi-factor authentication code, as well as the shared secret necessary to establish a communications channel with the RADIUS server, to the RADIUS server, which may determine whether the multi-factor authentication code is authentic. If so, the user may be granted access to the managed directory.

In an alternative embodiment, if the managed directory is managed and maintained within an on-premises customer network, the authentication service provides the shared secret and the multi-factor authentication code to a RADIUS server within the customer network through an agent operated by the managed directory service. For instance, when the administrator enables multi-factor authentication for a managed directory within the customer network and provides the requisite RADIUS server information, the managed directory service may initiate an agent and utilize the shared secret code to establish an encrypted communications session between the authentication service, the agent, and the customer's RADIUS server to enable transmission of the multi-factor authentication code to the RADIUS server. Thus, the authentication service may be able to communicate with the RADIUS server through the managed directory service agent to determine whether the provided multi-factor authentication code is authentic. If it is, the authentication service may enable the user to access the managed directory through the agent.

In this manner, a customer may be able to enable multi-factor authentication for a managed directory, whether the managed directory is operated and managed through the on-premises customer network or off-premises, by the managed directory service. In addition, the techniques described and suggested herein facilitate additional technical advantages. For example, because, in some embodiments, the multi-factor authentication of a user is performed through an authentication service, managed directory service and a RADIUS server, the managed directory itself may not be required to be an active participant in the authentication process. This, in turn, may provide additional security for the managed directory, as well as preserve any resources of the managed directory that may be utilized by other authenticated users of the managed directory.

FIG. 1 shows an illustrative example of an environment 100 in which various embodiments can be implemented. In the environment 100, a customer user 102 may utilize a user client (e.g., browser application or computing device) to input an IP address of a particular managed directory. The managed directory may be managed within an on-premises customer network by one or more administrators and/or processes provided by the customer. Alternatively, the managed directory may be managed and operated through a managed directory service 108, provided by a computing resource service provider to its customers. The customer user 102 may be associated with the customer as a delegated user of the managed directory for a variety of purposes. For instance, through use of the managed directory, the customer user 102 may be able to provision additional computing resources to support various applications and processes necessary to support the customer's business needs.

When the customer user 102 utilizes the user client to request access to the managed directory, the request may be received by an authentication service 106, which may initially prompt the customer user 102 to provide a first set of credentials. This first set of credentials may include one or more domain credentials for accessing the on-premises customer network. Alternatively, the first set of credentials may include one or more credentials (e.g., user name and corresponding password) usable to access the managed directory service 108 and the computing resource service provider. Whether the first set of credentials are related to the on-premises customer network or the managed directory service 108 may depend on the location of the managed directory that the customer user 102 is attempting to access. For instance, the first set of credentials received from the customer user 102 may include one or more domain credentials if the managed directory is operated and managed within an on-premises customer network. Alternatively, the first set of credentials may correspond to the managed directory service 108 if the managed directory is operated and maintained by the managed directory service 108.

In an embodiment, the authentication service 106 transmits, through an agent operating within the managed directory service 108 infrastructure, the received first set of credentials to the on-premises customer network for authentication. For instance, the on-premises customer network may include an authentication application or service, which may be configured to determine whether a set of domain credentials are valid or not. This application or service may transmit a notification to the authentication service 106 to indicate whether the received set of credentials is valid. In an alternative embodiment, the authentication service 106 may provide the received first set of credentials to the managed directory service 108, which may determine whether the set of credentials is valid. Alternatively, since the authentication service 106 is managed and maintained by the computing resource service provider and is associated with the managed directory service 108, the authentication service 106 may itself determine whether the first set of credentials is valid or not.

Regardless of whether the authentication service 106 is able to authenticate the first set of credentials received from the customer user 102, the authentication service 106 may prompt the customer user 102 to provide a second set of credentials (e.g., one-time passwords, unique password etc.) as requested by an administrator of the managed directory. For instance, when enabling multi-factor authentication through the managed directory service 108 interface, an administrator may generate a set of multi-factor authentication credentials, which may be shared with the customer user 102 to enable him/her to access the managed directory. In some embodiments, the multi-factor authentication code 104 may correspond to a one-time password generated by a one-time password token, wherein the token may be configured to display one-time passwords over a period of time. The RADIUS server may be maintained within the managed directory service 108 infrastructure if the managed directory is managed and operated by the managed directory service 108. Alternatively, if the managed directory is managed and operated within the on-premises customer network, the RADIUS server may also be maintained within the customer network. While RADIUS servers are used extensively for the purpose of illustration, other authentication servers configured to utilize different authentication protocols may be used. For instance, instead of utilizing a RADIUS server for authentication, the managed directory service 108 or customer network may utilize Diameter protocol servers or other services, such as a Short Message Service (SMS). Additionally, or alternatively, the managed directory service or on-premises customer network may incorporate other multi-factor authentication methods and tools, such as the Okta Service, provided by Okta, Inc. and PingID® provided by Ping Identity Corporation.

The customer user 102 may be provided with a multi-factor authentication code 104 that may be utilized to access the managed directory. As noted above, the multi-factor authentication code 104 may be a unique password or string of characters that may be provided to the customer user 102 by the administrator. Alternatively, the multi-factor authentication code 104 may be generated by one-time password token, which may be configured to display one or more one-time passwords. The one-time password token may comprise one or more hardware components that may be configured to collectively obtain and display one-time passwords. Accordingly, the one-time password token may comprise a token display unit that may be configured to display these one-time passwords. The one-time password token may be configured to communicate, such as through one or more communications networks (e.g., the Internet), with an authentication server to obtain a new one-time password after a specified period of time. Alternatively, the one-time password token may be configured to utilize one or more mathematical algorithms after a period of time to generate a new one-time password.

Once the customer user 102 has provided the addition set of credentials to the authentication service 106, the authentication service 106 may transmit the received set of credentials to a RADIUS server within the managed directory service 108 or, through the agent operating within the managed directory service 108, to a RADIUS server operating within the on-premises customer network to determine whether this set of credentials is valid. In an embodiment, if the authentication service 106 has determined that the first set of credentials are invalid, the authentication service 106 will receive the second set of credentials from the customer user 102 but will not initiate a communications channel with the corresponding RADIUS server, as the request to access the managed directory will be denied. Further, the authentication service 106 may inform the customer user 102 that the request has been denied without specifying which set of credentials failed the authentication process.

If both sets of credentials are valid, the authentication service 106 may enable the customer user 102 to access to the managed directory. For instance, if the managed directory is managed and operated by the managed directory service 108, the authentication service 106 may establish a communications channel between the customer user's 102 client and the managed directory within the managed directory service 108 to enable the customer user 102 to utilize the managed directory and provision any additional resources as necessary. Alternatively, if the managed directory is managed and operated by one or more administrators or processes within an on-premises customer network, the authentication service 106 may establish an encrypted communications session between the customer user 102, through an agent operating within the managed directory service 108, to the managed directory within the customer network.

It should be noted that in some embodiments, the authentication service 106 may prompt the customer user 102 for his multi-factor authentication code 104 before requesting the first set of credentials from the customer user 102. Upon receiving the multi-factor authentication code 104, the authentication service 106 may provide, through an agent of the managed directory service 108 or directly, the multi-factor credentials to the RADIUS server for authentication. Regardless of whether the RADIUS server determines that the multi-factor authentication code 104 is valid or not, the authentication service 106 may prompt the customer user 102 to provide the first set of credentials. If the multi-factor authentication code 104 is not valid, the authentication service 106 may reject the customer user's 102 request to access the managed directory without interacting with the managed directory service 108 or the on-premises customer network to determine whether the first set of credentials are valid. In other embodiments, the authentication service 106 may receive the multi-factor authentication code 104 and the first set of credentials from the customer user simultaneously, causing the authentication service 106 to transmit both sets of credentials to the managed directory service 108 and the RADIUS server for authentication.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

Figure 2:
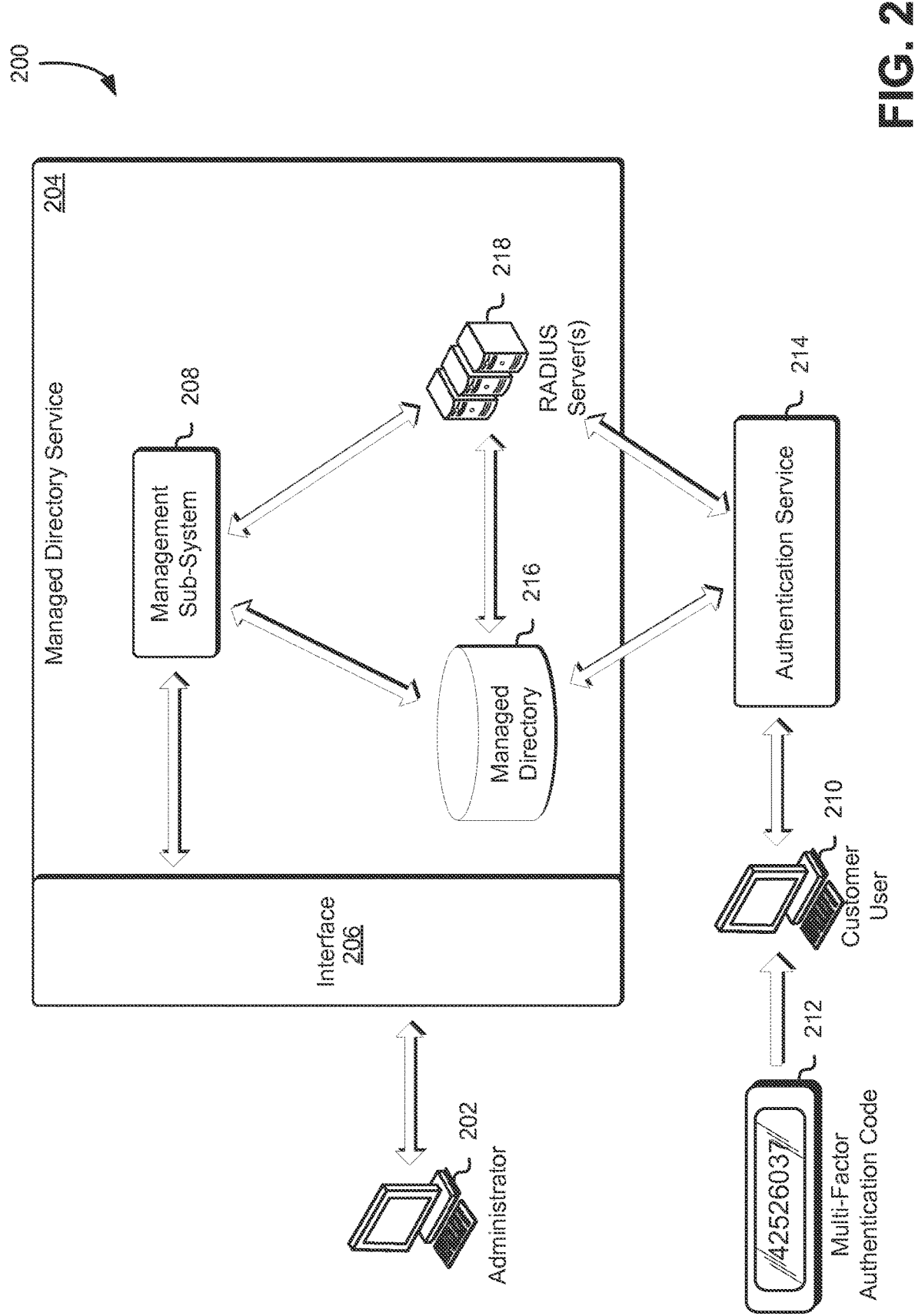
FIG. 2 shows an illustrative example of an environment in which multi-factor authentication is enabled for a managed directory managed by a managed directory service in accordance with at least one embodiment.

As noted above, a customer user may be required to provide two or more sets of credentials to an authentication service in order to access a managed directory. This managed directory may be managed and operated through a managed directory service provided by a computing resource service provider to its customers and the customers' delegated users. Accordingly, FIG. 2 shows an illustrative example of an environment 200 in which multi-factor authentication is enabled for a managed directory 216 managed by a managed directory service 204 in accordance with at least one embodiment. In the environment 200, an administrator 202 may access the managed directory service 204 through an interface 206 to request that multi-factor authentication be enabled for a managed directory 216 managed and operated by the managed directory service 204. For instance, through the interface 206, the administrator 202 may be able to select the applicable managed directory 216, the shared secret code that is to be utilized for establishing an encrypted communications session with the RADIUS server 218 and other configuration information for a RADIUS server 218 that is to receive the additional set of credentials and determine whether a user may be authenticated or not. In some embodiments, the managed directory service 204 may assign an existing RADIUS server 218 for the selected managed directory 216.

Once the administrator 202 has opted, through the interface 206, to enable multi-factor authentication for a particular managed directory 216 within the managed directory service 204, the management sub-system 208 of the managed directory service 204 may configure a RADIUS server 218 to manage access to the managed directory 216 through validation of one or more sets of credentials received from a customer user 210. For instance, the management sub-system 208 may configure the RADIUS server 218 to determine whether to authenticate a customer user 210 providing a particular multi-factor authentication code 212 to the authentication service 214 for access to the managed directory 216. Additionally, in some embodiments, the management sub-system 208 may communicate with the authentication service 214 to specify which RADIUS server 218 is responsible for authentication of customer users 210 attempting to access a particular managed directory 216.

As noted above, the customer user 210 may receive the multi-factor authentication code 212 from the administrator 202. Further, the customer may be provided with a set of credentials usable to access the managed directory service 204. When the customer user 210 utilizes a client (e.g., browser application) to request access to the managed directory 216, the authentication service 214 may receive the customer user's request and prompt the customer user 210 to provide a first set of credentials, which may be used to access the managed directory service 204 or the computing resource service provider. The authentication service 214, upon receiving the first set of credentials from the customer user 210, may access the managed directory service 204 and determine whether the provided set of credentials is valid. For instance, the managed directory service 204 may include a database (not shown) specifying a set of credentials for a multitude of customer users 210 that may be permitted to access the managed directory service 204. Alternatively, the authentication service 214 may include its own database specifying valid credentials for a variety of customer users 210. It should be noted that in some embodiments, the functionality of the authentication service 214 may be incorporated into the management sub-system 208 of the managed directory service 204. In other embodiments, the managed directory service 204 may include an authentication component for authenticating a customer user 210, obviating the need for a dedicated authentication service 214.

Regardless of whether the first set of credentials are valid or not, the authentication service 214 may prompt the computer user 210 to provide a second set of credentials for accessing the managed directory 216. For instance, if the authentication service 214 determines that the first set of credentials from the customer user 210 are not valid, the authentication service 214 may delay prompting the computer user 210 for the multi-factor authentication code 212 until a particular period of time has passed. This may serve to prevent the computer user 210 from discovering that the provided first set of credentials is invalid. Further, when the authentication service 214 receives the multi-factor authentication code 212 from the customer user 210 in response to the prompt, the authentication service 214 may delay notifying the computer user 210 that his/her request has been denied. The authentication service 214, in some embodiments, may not notify the customer user 210 which set of credentials are invalid in order to prevent the customer user 210 from attempting to identify the correct set of credentials through brute force techniques. Additionally, the authentication service 214, when receiving the multi-factor authentication code 212 form the customer user 210, may not access the RADIUS server 218 to validate the multi-factor authentication code 212, as the first set of credentials may be invalid, thus causing denial of the request.

If the customer user 210 has provided a valid first set of credentials, the authentication service 214 may prompt the user for the multi-factor authentication code 212. Once the customer user 210 has provided this multi-factor authentication code 212 to the authentication service 214, the authentication service 214 may transmit the multi-factor authentication code 212 to the RADIUS server 218, which may evaluate the received multi-factor authentication code 212 to determine if it is valid. If the multi-factor authentication code 212 is not valid, the RADIUS server 218 may transmit a notification to the authentication service 214, such as through one or more application programming interface (API) calls to the service, that the multi-factor authentication code 212 is not valid and that the request should therefore be denied. Subsequently, the authentication service 214 may deny the customer user's 210 request to access the managed directory 216. However, if the multi-factor authentication code 212 provided by the customer user 210 is valid, the RADIUS server 218 may transmit a notification to the authentication service 214 specifying that the customer user 210 has been authenticated and, thus, may access the managed directory 216. In some embodiments, the managed directory 216 may include an agent, which may be configured to establish an encrypted communications session between the authentication service 214 and the RADIUS server 218. Once the authentication service 214 receives the multi-factor authentication code 212 from the customer user 210, the authentication service 214, through this agent, may transmit the multi-factor authentication code 212 to the RADIUS server 218.

If the customer user 210 has been authenticated by the authentication service 214 and the RADIUS server 218, the authentication service 214 may establish an encrypted communications session between the customer user 210 and the managed directory 216 managed and operated by the managed directory service 204. This may enable the customer user 210 to utilize the managed directory 216 for provisioning additional computing resources and otherwise support the customer's business needs. In some embodiments, the authentication service 214 may require the customer user 210 to again provide his/her set of credentials and the multi-factor authentication code 212 to ensure that the customer user 210 may continue utilizing the managed directory 216.

Figure 3:
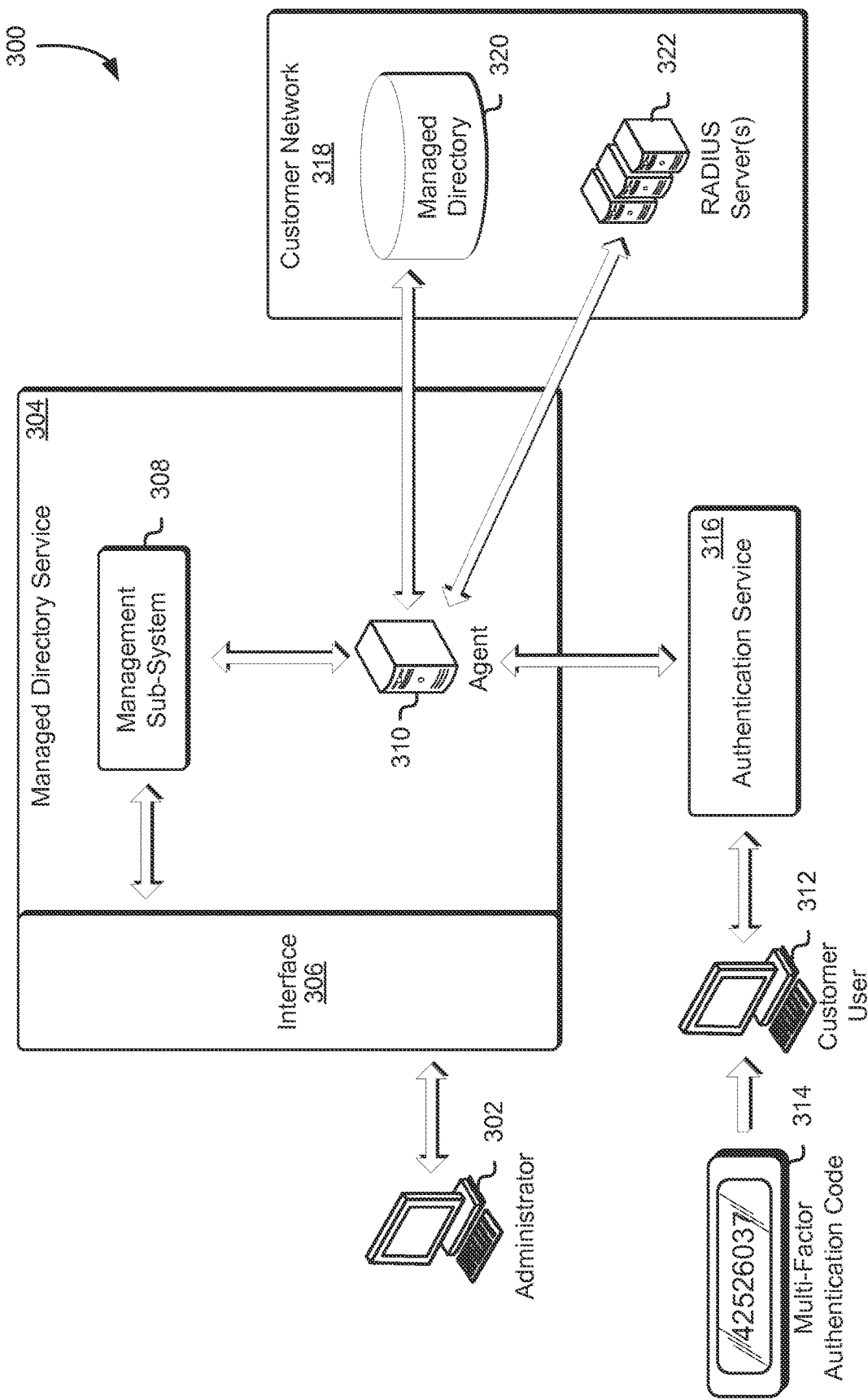
FIG. 3 shows an illustrative example of an environment in which multi-factor authentication is enabled for a managed directory managed within an on-premises customer network in accordance with at least one embodiment.

As noted above, a customer user may be required to provide two or more sets of credentials to an authentication service in order to access a managed directory managed and operated within an on-premises customer network. The authentication service may be configured to access the customer network through an agent provided by a managed directory service. Accordingly, FIG. 3 shows an illustrative example of an environment 300 in which multi-factor authentication is enabled for a managed directory 320 managed within an on-premises customer network 318 in accordance with at least one embodiment. In the environment 300, an administrator 302 of the customer network 318 may access a managed directory service 304 through an interface 306 in order to configure multi-factor authentication for a managed directory 320 within the customer network 318. The interface 306 may be similar to the interface described above in connection with FIG. 2 except for some key differences. For instance, the interface 306 may require the administrator 302 to identify the RADIUS server 322 within the customer network 318 that is configured to authenticate one or more customer users 312 of the managed directory 320. For example, the administrator 302 may be required to provide an IP address for the RADIUS server 322, a corresponding User Datagram Protocol (UDP) port for messages to and from the RADIUS server 322, an authentication protocol for authenticating the customer user 312 (e.g., Password Authentication Protocol (PAP), Challenge-Handshake Authentication Protocol (CHAP), MS-CHAPv1, MS-CHAPv2, etc.) and the like. The administrator 302 may define, through the interface 306, the shared secret code that may be used to establish an encrypted communications session with the RADIUS server 322 within the customer network 318.

Once the administrator 302 has enabled multi-factor authentication for the managed directory 320 within the customer network 318, the management sub-system 308 of the managed directory service 304 may configure a managed directory service agent 310 (also referred to as agent) to enable communications between the authentication service 316 and the RADIUS server 322 to allow the authentication service 316 to transmit the multi-factor authentication code 314 from the customer user 312 to the RADIUS server 322 for authentication of the customer user 312. For instance, when the authentication service 316 receives the multi-factor authentication code 314 from the customer user 312, the authentication service 316 may transmit this multi-factor authentication code 314, along with the shared secret code, to the RADIUS server 322 within the customer network 318 through the agent 310 for validation of the multi-factor authentication code 314. Additionally, if the customer user 312 is successfully authenticated, the authentication service 316 may establish an encrypted communications session between the customer user 312 and the managed directory 320 through the agent 310. It should be noted that in some embodiments, the functionality of the authentication service 316 may be incorporated into the management sub-system 308 of the managed directory service 304. In other embodiments, the managed directory service 304 may include an authentication component for authenticating a customer user 312, obviating the need for a dedicated authentication service 316.

When a customer user 312 attempts to access the managed directory 320 through a computing resource service provider interface, the authentication service 316 may receive the customer user's 312 request and prompt the computer user 312 to provide a first set of credentials corresponding to the customer network 318. The first set of credentials may be domain credentials, which a separate customer network 318 authentication service or process (not shown) may utilize to authenticate the customer user 312. Accordingly, when the authentication service 316 receives the first set of credentials from the customer user 312, the authentication service 316, through the agent 310, may provide the first set of credentials to the customer network 318 authentication service or process to determine whether the first set of credentials are valid. Alternatively, the authentication service 316 may include a database specifying the one or more valid credentials for a plurality of customer users for the customer network 318. Thus, in this particular instance, the authentication service 316 need not access the customer network 318 to validate the received first set of credentials.

Regardless of whether the first set of credentials are valid or not, the authentication service 316 may subsequently prompt the customer user 312 to provide his/her multi-factor authentication code 314 for accessing the managed directory 320. For instance, similar to the authentication service described above in connection with FIG. 2, if the authentication service 316 determines that the first set of credentials from the customer user 312 are not valid, the authentication service 316 may delay prompting the customer user 312 for the multi-factor authentication code 314 until a particular period of time has passed. The authentication service 316, upon receiving the multi-factor authentication code 314 form the customer user 312, may not transmit the multi-factor authentication code 314 to the RADIUS server 322 to validate the multi-factor authentication code 314, as the first set of credentials may be invalid, thus causing denial of the request. The authentication service 316 may inform the customer user 312 that his/her request to access the managed directory 320 has been denied without specifying with set of credentials caused the authentication failure.

If the authentication service 316 is able to validate the customer user's 312 first set of credentials, the authentication service 316 may establish a connection with the RADIUS server 322 to further validate the multi-factor authentication code 314 from the customer user 312. If the RADIUS server 322 is unable to authenticate the multi-factor authentication code 314, the RADIUS server 322 may transmit, through the agent 310, a notification to the authentication service 316 of such and that the customer user 312 should be denied access to the managed directory 320. This may cause the authentication service 316 to deny the customer user's 312 request to access the managed directory 320. However, if the RADIUS server 322 is able to authenticate the customer user 312 through presentation of the multi-factor authentication code 314, the authentication service 316 may establish an encrypted communications session between the customer user 312 and the managed directory 320 through the managed directory service agent 310.

As noted above, an administrator of a managed directory, whether managed and operated by a managed directory service or within an on-premises customer network, may interact with a managed directory service interface to enable multi-factor authentication for the managed directory. Accordingly, FIG. 4 shows an illustrative example of an interface 400 for enabling and configuring multi-factor authentication for a managed directory in accordance with at least one embodiment. The interface 400 may enable an administrator of a managed directory to define the parameters of the multi-factor authentication to be performed for the managed directory and any other components required to perform the authentication of a customer user.

The interface 400 may include a multi-factor authentication toggle 402, which may enable an administrator to specify whether multi-factor authentication may be enabled for a particular managed directory. For instance, as illustrated in FIG. 4, an administrator has utilized the multi-factor authentication toggle 402 to enable multi-factor authentication for a particular managed directory. By selecting the multi-factor authentication toggle 402 to enable multi-factor authentication, the interface 400 may cause the other input fields to be edited by the administrator. However, if the multi-factor authentication toggle 402 is not enabled, the administrator may not be able to provide input into any of the other input fields provided by the interface 400 for multi-factor authentication.

Once the administrator has enabled multi-factor authentication through use of the multi-factor authentication toggle 402, the administrator may be able to configure the multi-factor authentication parameters for the particular managed directory. For instance, the interface 400 may include a RADIUS server status field 404, which may specify whether the authentication service is currently connected to the administrator's specified RADIUS server, whether the RADIUS server is provided by the managed directory service or is operating within the on-premises customer network. When the administrator completes the process of enabling multi-factor authentication for a particular managed directory, the managed directory may attempt, through the authentication service, to establish a connection with the RADIUS server. The status of that connection may be displayed within the RADIUS server status field 404.

The interface 400 may further include a RADIUS server address field 406 and a UDP port field 408, which the administrator may utilize to specify the address (e.g., IP address) of the RADIUS server and the corresponding UDP port for receiving and transmitting RADIUS messages, respectively. The managed directory service may utilize the information provided in these two fields 406, 408 to create a secure connection between the authentication service and the RADIUS server for validation of multi-factor authentication codes received from customer users. In some embodiments, if the RADIUS server is not located within the customer network but is instead provided by the managed directory service (e.g., the managed directory is operated and managed by the managed directory service), the RADIUS server address field 406 and UDP port field 408 may be absent or otherwise automatically filled in by the managed directory service, as the managed directory service may assign a RADIUS server to the particular managed directory. In some embodiments, through the RADIUS server address field 406, the interface 400 may enable the administrator to provide a RADIUS server host name, domain name, or other identifier of one or more RADIUS servers within the on-premises customer network or the managed directory service.

In addition to the RADIUS server address field 406 and the UDP port field 408, the interface 400 may include a shared secret code field 410 and a confirmation field 412 wherein the administrator may define the shared secret code that may be utilized by the authentication service and the managed directory to communicate with the RADIUS server. This may enable the authentication service and the managed directory to establish a secure communications channel with the RADIUS server and authenticate the customer based on the provided multi-factor authentication code from the customer. The shared secret code field 410 and the confirmation field 412 may enable the administrator to provide a string of alphanumeric characters or other characters that may be utilized as the shared secret. In an alternative embodiment, the shared secret code field 410 and the confirmation field 412 may enable the administrator to input a shared secret, which may be used to enable the RADIUS server to communicate with a Strong Authentication (SA) server to obtain the expected one-time password value that is to be provided by the customer user at a particular time through his/her one-time password token. It should be noted that while FIG. 4 illustrates the one or more characters that may comprise the shared secret code, the shared secret code field 410 and the confirmation field 412 may be configured to conceal the one or more characters of the shared secret code as they are provided by the administrator within these fields.

The interface 400 may include a protocol field 414 which may enable the administrator to define which authentication protocol is to be utilized to authenticate the particular customer user when he/she provides the multi-factor authentication code to the authentication service causing the authentication service to provide the code to the specified RADIUS server. For instance, the administrator may be able to select from a plurality of authentication protocols such as PAP, CHAP, MS-CHAPv1, MS-CHAPv2 and the like. The interface 400 may include other fields, such as the server timeout field 416 and the max entries field 418, which may enable the administrator to determine how long the authentication service may attempt to communicate with the RADIUS server and the maximum amount of credential entries a customer user may submit before the request to access the managed directory is denied, respectively. It should be noted that in some embodiments, the interface 400 may include additional, fewer or alternative fields for configuring and enabling multi-factor authentication for a particular managed directory. For instance, as noted above, if the managed directory is managed and operated through a managed directory service, the interface 400 may not include the RADIUS server address field 406 or the UDP port field 408, as these may be provided automatically by the managed directory service.

The interface 400 may include an update button 420, which the administrator may utilize to accept all changes made within the interface. By selecting the update button 420, the managed directory service may utilize the information provided by the administrator to configure an agent, which may be used to facilitate communications between the authentication service and the specified one or more RADIUS servers. Further, the managed directory service may provide the shared secret code to the agent, which may be used to establish the encrypted communications session with the one or more RADIUS servers to enable authentication of one or more customer users when they attempt to access the managed directory.

In an embodiment, the administrator can use the interface 400 to enable multi-factor authentication for certain circumstances, including specific applications and networks. For instance, the administrator may specify that multi-factor authentication may be required if the customer user client is operating within a public network or other network separate from the managed directory service network or the on-premises customer network. Additionally, the administrator may specify that multi-factor authentication may be required for applications that are not related to other computing resources within the managed directory service network or the on-premises customer network. The authentication service may determine, based at least in part on characteristics for an interface (e.g., application, network Internet Protocol (IP) addresses, etc.) for providing the a set of credentials for accessing the managed directory and the administrator's preferences, whether multi-factor authentication is required and prompt the customer user to provide the multi-factor authentication codes.

Figure 5:
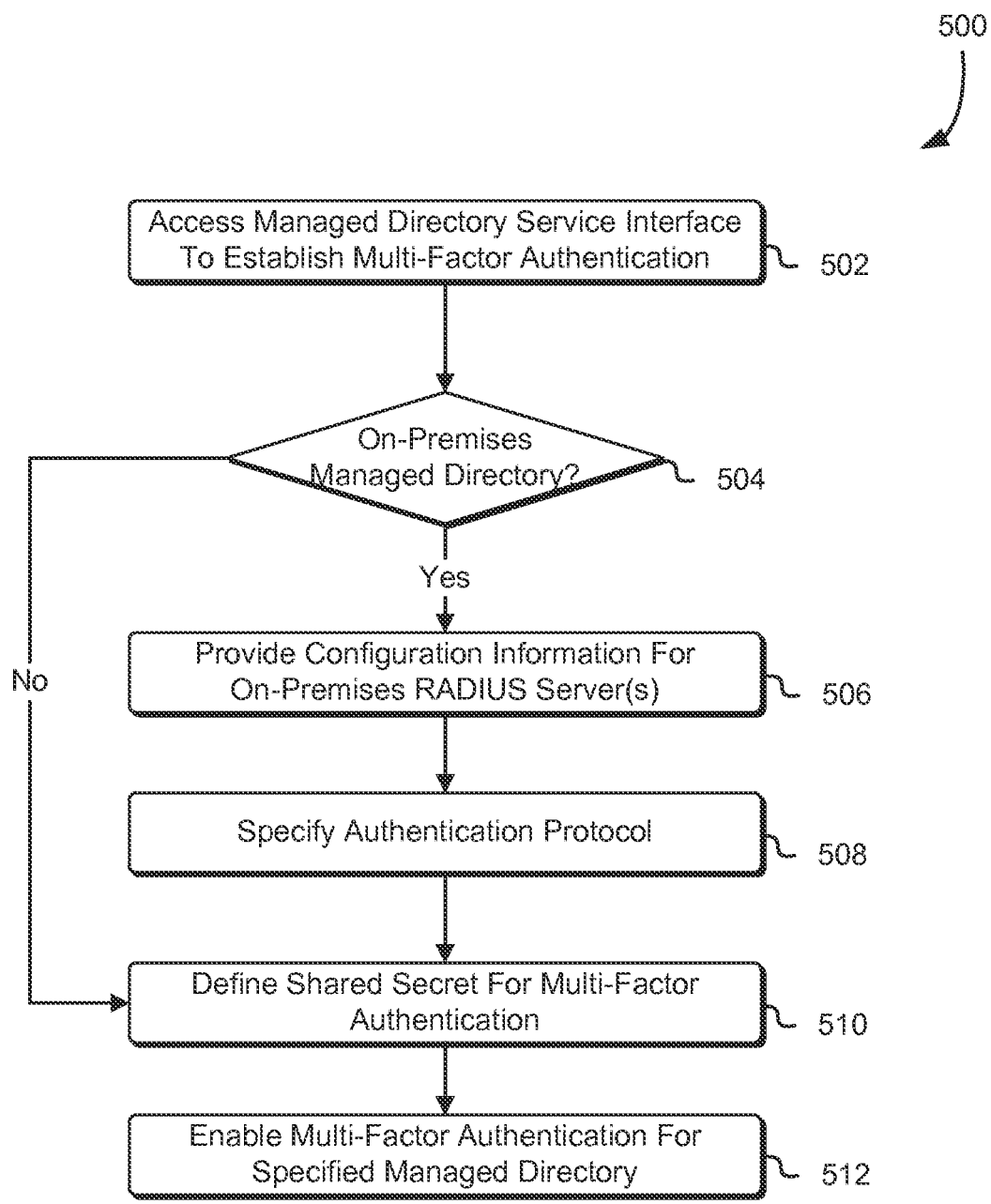
FIG. 5 shows an illustrative example of a process for utilizing a managed directory service interface for enabling multi-factor authentication for a managed directory in accordance with at least one embodiment.

As noted above, an administrator may access a managed directory service interface to enable multi-factor authentication for one or more managed directories, whether these one or more managed directories reside within an on-premises customer network or within the managed directory service infrastructure itself. Accordingly, FIG. 5 shows an illustrative example of a process 500 for utilizing a managed directory service interface for enabling multi-factor authentication for a managed directory in accordance with at least one embodiment. The process 500 may be performed by the aforementioned administrator, who may be granted permission by a customer to manage a managed directory on its behalf.

The administrator may utilize the managed directory service to manage and operate one or more managed directories on behalf of the customer. For instance, the administrator may utilize the managed directory for the provisioning and management of a variety of computing resources, as well as other customer data. At any time, the administrator may want to delegate access to the managed directory to other customer users, each of which may be tasked to perform one or more operations through use of the managed directory on behalf of the customer. In such circumstances, the administrator may want to enable multi-factor authentication for the managed directory in order to ensure that each customer user is authenticated in a secure and robust fashion. Thus, the administrator may access 502 a managed directory service interface to establish multi-factor authentication for the particular managed directory.

Within the managed directory service interface, the administrator may be able to select which managed directory he/she would like to have multi-factor authentication enabled. For instance, the administrator may be tasked with managing one or more managed directories within the on-premises customer network. Additionally, or alternatively, one or more managed directories may reside within the managed directory service network. Thus, the administrator may determine 504 whether to configure the multi-factor authentication for a managed directory within the managed directory service network or the on-premises customer network.

If the managed directory is managed and maintained within the on-premises customer network, the administrator may utilize the interface to provide 506 configuration information for one or more on-premises RADIUS servers that may be utilized for multi-factor authentication. For instance, the administrator may be required to provide, through the interface, the IP addresses for the one or more RADIUS servers in order to enable the managed directory service to configure an agent that may enable communications between the authentication service and the RADIUS servers. Additionally, the administrator may be required to provide the UDP port for transmitting and receiving RADIUS messages to and from the RADIUS servers.

Once the administrator has provided the necessary configuration information for the on-premises RADIUS servers, the administrator may specify 508 which authentication protocol is to be utilized to authenticate a customer user. As noted above, the managed directory service interface may enable the administrator to select from a variety of authentication protocols, such as PAP, CHAP, MS-CHAPv1, MS-CHAPv2 and the like. These authentication protocols may enable the authentication service to communicate with the RADIUS servers securely and provide the multi-factor authentication code from the customer user.

If the managed directory resides within the managed directory service network or the administrator has provided the RADIUS server configuration information and has specified the authentication protocol to be used, the administrator may define 510 a shared secret code for establishing an encrypted communications session with the RADIUS server. For instance, the administrator may define a character string that may be utilized as the shared secret code for establishing the encrypted communications session with the RADIUS server. This character string may be provided to the RADIUS server and an agent (e.g., if the RADIUS server is located within the customer network) or the authentication service (e.g., if the RADIUS server is located within the managed directory network) such that, when the authentication service receives the multi-factor authentication code from a customer user, the authentication service or agent may provide this character string to the RADIUS server to establish an encrypted communications session between the authentication service and the RADIUS server. Alternatively, if the multi-factor authentication code comprises a one-time password, which may correspond to a particular one-time password token issued to the customer user, the interface may provide the shared secret code to an SA server to enable the RADIUS server to communicate with the SA server to determine an expected one-time password, which may be compared to the customer user-provided one-time password for authentication. It should be noted that in some embodiments, if the RADIUS servers are maintained within the managed directory service network, the administrator may not be required to provide a shared secret code for enabling communications with the RADIUS servers. In such instances, the managed directory service may establish its own shared secret code, which may be used by the authentication service and the managed directory to communicate with the RADIUS servers.

Once the administrator has provided all the necessary information for enabling multi-factor authentication for the selected managed directory, the administrator may utilize the update button on the managed directory service interface to enable 512 multi-factor authentication for the specified managed directory. This may cause the managed directory service to configure one or more RADIUS servers for customer user multi-factor authentication. Additionally, if the managed directory resides within the on-premises customer network, the managed directory service may utilize the provided information to configure an agent to enable secure communications between the authentication service and the on-premises RADIUS servers.

Figure 6:
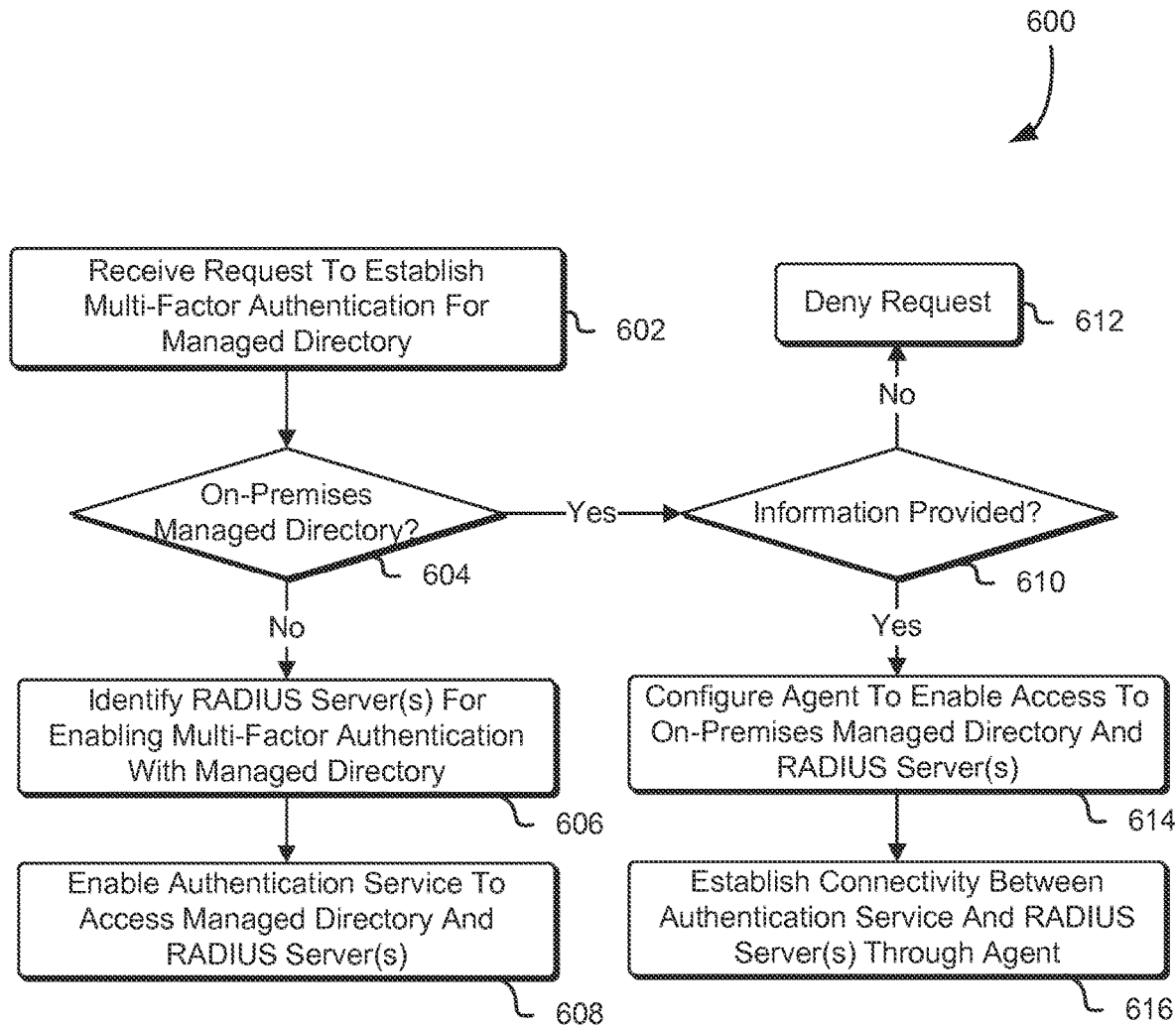
FIG. 6 shows an illustrative example of a process for establishing multi-factor authentication for a managed directory in accordance with at least one embodiment.

As noted above, a managed directory service may utilize information provided by an administrator through the managed directory service to enable multi-factor authentication for one or more managed directories residing within the managed directory service network or the on-premises customer network. Accordingly, FIG. 6 shows an illustrative example of a process 600 for establishing multi-factor authentication for a managed directory in accordance with at least one embodiment. The process 600 may be performed by aforementioned managed directory service, which may be configured to configure one or more RADIUS servers either within the managed directory service network or the on-premises customer network, configure an agent for communications between the authentication service and the RADIUS server if the managed directory resides within the on-premises customer network, and receive information from an administrator through a managed directory service interface.

As described above in connection with FIG. 5, an administrator of one or more managed directories may interact with a managed directory service interface to enable multi-factor authentication for these one or more managed directories. Once the administrator has completed providing information regarding the one or more RADIUS servers and the shared secret code that is to be used for establishing an encrypted communications channel with the RADIUS servers, the administrator may utilize an update button to accept these changes and transmit a request to the managed directory service to enable multi-factor authentication for the specified one or more managed directories. Thus, the managed directory service may receive 602 a request from the administrator to establish multi-factor authentication for a particular managed directory.

Based at least in part on the received request, the managed directory service may determine 604 whether the selected managed directory resides within an on-premises customer network or resides within the managed directory service network. If the managed directory resides within the managed directory service network, the managed directory service may identify 606 the one or more RADIUS servers that may be utilized to enable multi-factor authentication for the managed directory. For instance, the managed directory service may configure one or more RADIUS servers that may be utilized to process any multi-factor authentication codes received from the authentication service and determine whether these multi-factor authentication codes are valid. This may enable the RADIUS servers, through the authentication service, to accept or deny any customer user request to access the one or more managed directories. Once the managed directory service has identified the appropriate RADIUS servers for the managed directory, the managed directory service may enable 608 the authentication service to access the managed directory, if the customer user has been authenticated, and the RADIUS servers for authentication of the customer user.

If the managed directory resides within an on-premises customer network, the managed directory service may determine 610 whether the administrator has provided sufficient information to enable multi-factor authentication for the selected managed directory. For instance, as noted above, an administrator may be required to provide an IP address and UDP port number for the one or more RADIUS servers that are to be utilized for multi-factor authentication. Additionally, the administrator may be required to specify the shared secret code that is to be utilized for establishing an encrypted communications session with the RADIUS servers. Supplemental information may include the maximum amount of entries a customer user may provide before his/her request to access the managed directory is denied and the amount of time that may pass before the session with the RADIUS server has timed out. If the administrator has not provided the necessary information, the managed directory service may deny 612 the administrator's request to enable multi-factor authentication for the selected managed directory.

Once the managed directory service has determined that the administrator has provided the necessary information to enable multi-factor authentication for a managed directory residing in the on-premises customer network, the managed directory service may utilize the provided information to configure 614 an agent to enable access to the managed directory and RADIUS server within the customer network. For instance, the managed directory service may configure the agent to utilize the provided IP address and UDP port number to establish an encrypted communications session with the RADIUS server and transmit messages to and receive messages from the RADIUS server. Additionally, the agent may be configured to access the managed directory in the event that a customer user has been authenticated by the authentication service and the RADIUS server.

When a customer user attempts to access the managed directory, the authentication server may first determine whether the first set of credentials received from the customer user are valid. If these credentials are valid, the authentication service may prompt the customer user to provide the multi-factor authentication code, which may be validated by the RADIUS server to enable user access to the managed directory. Thus, when the authentication service receives this multi-factor authentication code, the authentication service may communicate with the agent to access the RADIUS server. In response to the request from the authentication service, the managed directory service may establish 616 connectivity between the authentication service and the RADIUS server through the agent. This may enable the authentication service to provide the received multi-factor authentication code to the RADIUS server for analysis and validation.

Figure 7:
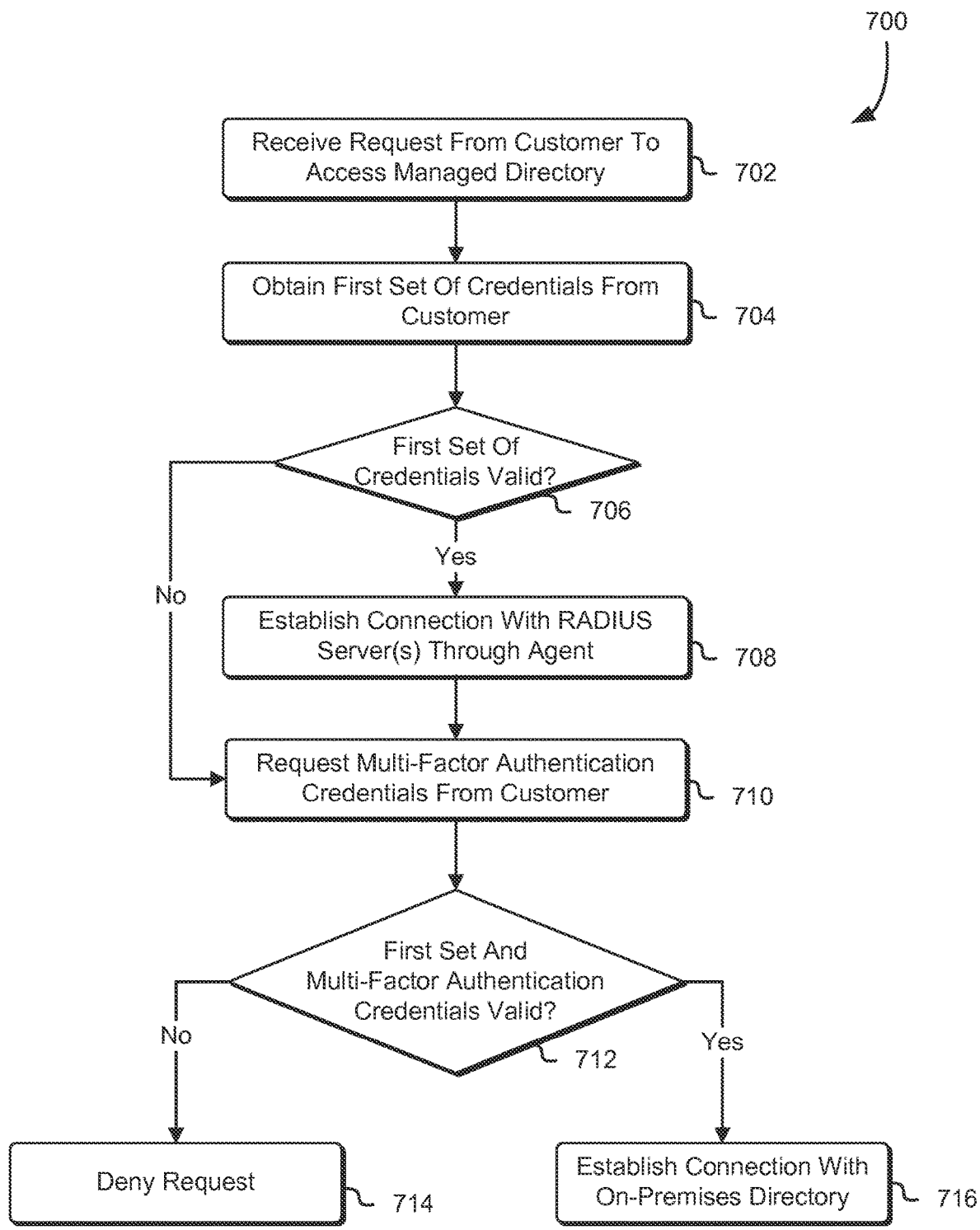
FIG. 7 shows an illustrative example of a process for authenticating a customer user utilizing a set of multi-factor authentication credentials for accessing an on-premises managed directory in accordance with at least one embodiment.

As noted above, a customer user may transmit a request to access a managed directory within an on-premises customer network. The request may be processed through use of an authentication service associated with a managed directory service, which may be utilized to enable multi-factor authentication for the managed directory. As a result, the customer user may be required to provide two or more sets of credentials (e.g., domain credentials, multi-factor authentication codes, etc.) to the authentication service for validation. Accordingly, FIG. 7 shows an illustrative example of a process 700 for authenticating a customer user utilizing a set of multi-factor authentication credentials for accessing an on-premises managed directory in accordance with at least one embodiment. The process 700 may be performed by an authentication service, which may be configured to communicate with an on-premises RADIUS server through an agent provided by the managed directory service. Further, in some embodiments, the authentication service may access the managed directory service to verify one or more sets of credentials from the customer user.

At any time, a customer user may submit a request to access a particular on-premises managed directory through use of an interface provided by the managed directory service or the computing resource service provider. This request may be transmitted from the interface to the authentication service for authentication of the customer user. Thus, the authentication service may receive 702 a request from the customer user to access the managed directory within the on-premises customer network. The request may specify an identifier for the particular managed directory and other information necessary for the authentication service to communicate with the appropriate services and components necessary to establish a connection with the managed directory should the customer user be authenticated.

The authentication service, upon receiving the request from the customer user, may prompt the customer user to provide a first set of credentials for authentication. For example, if the authentication service utilizes the OAuth standard for authentication and authorization, the authentication service may provide the customer user client with a Hypertext Transfer Protocol (HTTP) response in the form of one or more HyperText Markup Language (HTML) pages. These HTML pages may include one or more input fields, which may be used by the user of the user client to input his/her set of credentials. This first set of credentials may include domain credentials, which may be utilized to access the customer network. In response to the prompt, the customer user may provide this first set of credentials to the authentication service, which may obtain 704 this first set of credentials and determine 706 whether these credentials are valid. For instance, the authentication service, through these HTML pages or other response may receive the one or more sets of credentials from the user client. In some embodiments, the authentication service may include a database of valid domain credentials corresponding to one or more customer users of the customer network. In such instances, the authentication service may compare the received first set of credentials to this database to determine whether these credentials are valid. Alternatively, if the authentication service does not maintain a database of known credentials, the authentication service may transmit a request to an authentication server within the customer network to determine whether these credentials are valid.

If the received first set of credentials is valid, the authentication service may establish 708 an encrypted communications session with the one or more RADIUS servers within the on-premises customer network through an agent provided by the managed directory service. For instance, the authentication service, upon validating the first set of credentials, may transmit a request to the managed directory service to establish a connection between the authentication service and the RADIUS server within the on-premises customer network. The managed directory, in response to the request, may provision an agent, which may be configured to establish the encrypted communications session from the authentication service, through the agent, and to the RADIUS server.

Once the authentication service has established a connection with the RADIUS server through the managed directory service agent, the authentication service may request 710 that the customer user provide his/her multi-factor authentication credentials to the authentication service to determine 712 whether the multi-factor authentication credentials are valid. For instance, when the authentication service receives the multi-factor authentication credentials from the customer user, the authentication service may transmit these credentials to the RADIUS server through the encrypted communications session established by the managed directory service agent. This may enable the RADIUS server to evaluate these received credentials and determine whether they are valid. For example, as noted above, the administrator of the managed directory may have provided the managed directory service and the RADIUS server with the multi-factor authentication code that is to be used for authentication of a customer user. The RADIUS server may compare the received multi-factor authentication credentials to this code to determine whether there is a match. If there is no match, then the received credentials may be invalid.

If the authentication service, upon notification from the RADIUS server with regard to the multi-factor authentication credentials, determines that the multi-factor authentication credentials are valid, the authentication service may establish 716 a secure communications channel, through the agent, between the customer user and the managed directory, as the first set of credentials and the multi-factor authentication credentials are both valid. For instance, the authentication service may issue the customer user client an OAuth access token, which may be utilized by the user client to access the managed directory. This may enable the customer user to access and utilize the on-premises managed directory and provision computing resources as necessary to support the customer's business needs. However, if the authentication service determines that the multi-factor authentication credentials are not valid, even if the first set of credentials are valid, the authentication service may deny 714 the customer user's request. In some embodiments, the customer user may be given a number of opportunities, as defined by the administrator, to provide the correct first set of credentials and multi-factor authentication credentials. If this number of opportunities has been reached, the authentication service may deny 714 the request upon failure by the customer user to provide valid credentials.

In some embodiments, the RADIUS server may return an "Access Challenge" response upon receiving the multi-factor authentication credentials and determining that these credentials are valid. For instance, even if the multi-factor authentication credentials are valid, the RADIUS server may require additional information to authenticate the customer user. This may occur, for example, if the RADIUS server is unable to authenticate the customer user's device, the network the customer user's device is connected to, and the like. In such cases, the RADIUS server may cause the authentication service to prompt the customer user for an additional set of credentials that may be used to authenticate the customer user. As another example, the RADIUS server may cause the authentication service to transmit an authentication code to a different customer user device, which the customer user may be required to provide through the original customer user's device to verify the identity of the customer user and enable access to the managed directory through the device.

In an embodiment, if the first set of credentials received from the customer user is not valid, the authentication service will forego establishing a connection with the RADIUS server and may instead request 710 that the customer user provide the multi-factor authentication credentials to the authentication service. This may prevent the customer user from suspecting that the first set of credentials is invalid. Once the authentication service has received the multi-factor authentication credentials from the customer user, the authentication service may deny 714 the customer user's request to access the managed directory, as the first set of credentials are not valid. Before notifying the customer user that the request has been denied, the authentication service may delay informing the customer user by presenting the customer user with a standby status screen or other indication that the authentication service is processing the request. Further, the authentication service may not indicate which set of credentials were invalid when denying the customer user's request. This may further serve to prevent the customer user from suspecting which set of credentials are invalid.

It should be noted that in some embodiments, the process 700 may be performed using a different order of operations, additional operations and/or alternative operations. For instance, in some embodiments, the authentication service may prompt the customer user for his/her multi-factor authentication credentials before requesting the first set of credentials from the customer user. Upon receiving the multi-factor authentication credentials, the authentication service may provide, through an agent of the managed directory service or directly, these credentials to the RADIUS server for authentication. Regardless of whether the RADIUS server determines that the multi-factor authentication credentials are valid or not, the authentication service may prompt the customer user to provide the first set of credentials. If the multi-factor authentication credentials are not valid, the authentication service may deny the customer user's request to access the managed directory without interacting with the managed directory service to determine whether the first set of credentials are valid. In other embodiments, the authentication service may receive the multi-factor authentication credentials and the first set of credentials from the customer user simultaneously, causing the authentication service to transmit both sets of credentials to the managed directory service and the RADIUS server for authentication.

Figure 8:
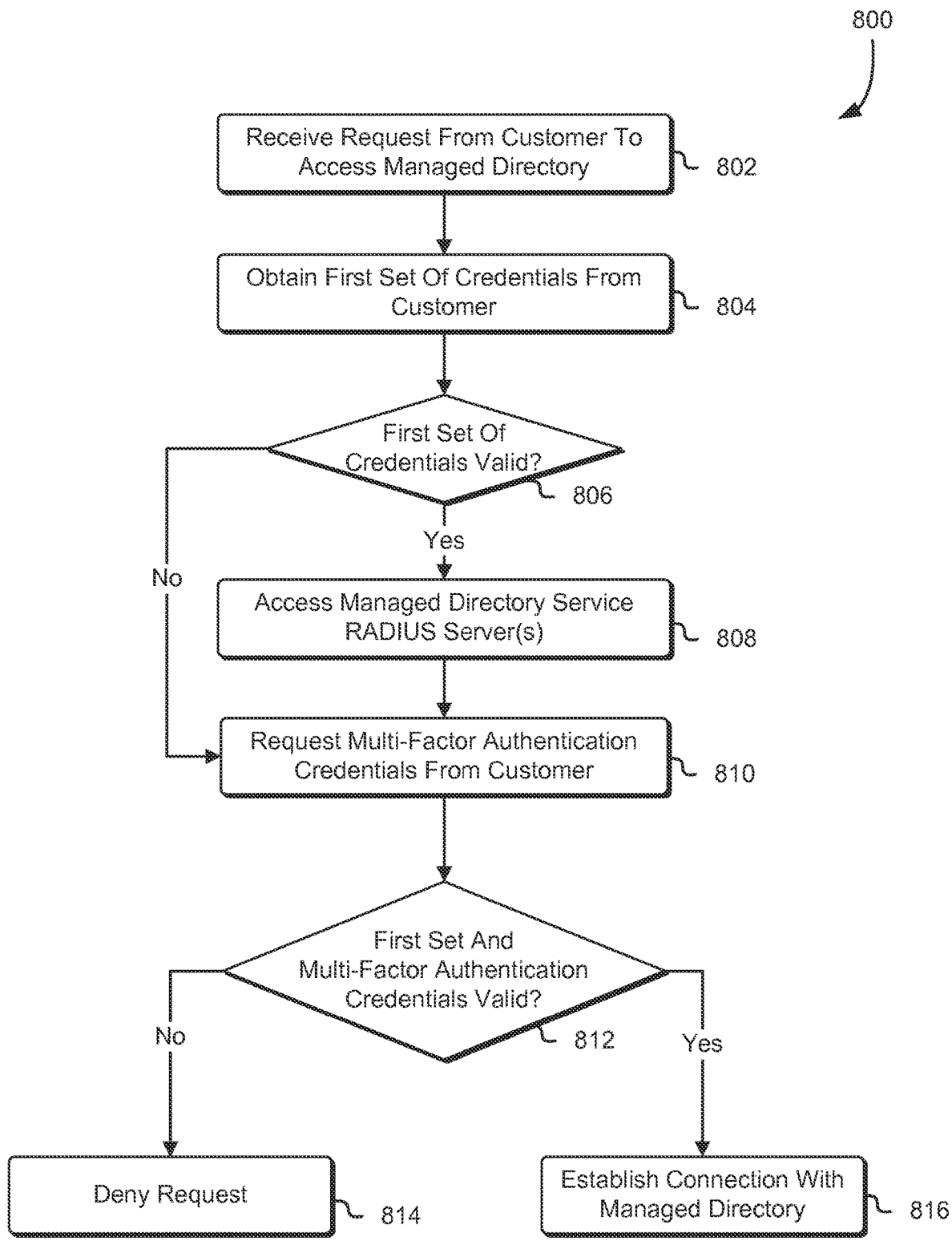
FIG. 8 shows an illustrative example of a process for authenticating a customer user utilizing a set of multi-factor authentication credentials for accessing a managed directory managed by a managed directory service in accordance with at least one embodiment.

As noted above, a customer user may transmit a request to access a managed directory managed and operated by a managed directory service on behalf of a customer and/or administrator. Similar to the process described above in connection with FIG. 7, the request may be processed through use of an authentication service associated with the managed directory service, which may be utilized to enable multi-factor authentication for the managed directory. Accordingly, FIG. 8 shows an illustrative example of a process 800 for authenticating a customer user utilizing a set of multi-factor authentication credentials for accessing a managed directory managed by a managed directory service in accordance with at least one embodiment. The process 800 may be performed by an authentication service, which may be configured to communicate with a managed directory service RADIUS server. Further, in some embodiments, the authentication service may access the managed directory service to verify other, non-multi-factor authentication credentials from the customer user (e.g., credentials usable to access the managed directory service, etc.).

Similar to the process described above in connection with FIG. 7, the authentication service may receive 802 a request from the customer user to access the managed directory within the managed directory service and, as a result of prompting the customer user to provide a first set of credentials for authentication, obtain 804 this first set of credentials from the customer user. For example, if the authentication service may provide the customer user client with a an HTTP response in the form of one or more HTML pages, which may include one or more input fields for enabling the customer user to provide the first set of credentials. Once the authentication service has received the first set of credentials from the customer user, the authentication service may determine 806 whether this first set of credentials is valid. For instance, in some embodiments, the authentication service may include a database of valid managed directory service credentials corresponding to one or more customer users. In such instances, the authentication service may compare the received first set of credentials to this database to determine whether these credentials are valid. Alternatively, if the authentication service does not maintain a database of known credentials, the authentication service may transmit a request to the managed directory service to determine whether these credentials are valid.

If the first set of credentials is determined to be valid, the authentication service may access 808 the RADIUS server for further validation of multi-factor authentication credentials from the customer user. In order to access the RADIUS server, the authentication service may establish an encrypted communications session with the RADIUS server within the managed directory service network. Subsequently, the authentication service may request 810 one or more multi-factor authentication credentials from the customer user to enable the RADIUS server to validate the multi-factor authentication credentials and, hence, authenticate the customer user.

If the RADIUS server determines, based at least in part on an analysis of the received multi-factor authentication credentials, that the multi-factor authentication credentials are not valid, the RADIUS server may transmit a notification to the authentication service that specifies that the multi-factor authentication credentials are not valid and that the customer user's request to access the managed directory should be denied. Alternatively, if the RADIUS server determines that the multi-factor authentication credentials are valid, the RADIUS server may transmit a notification to the authentication server that the request should be fulfilled. Through receipt of either notification, the authentication service may determine 812 whether the multi-factor authentication credentials are valid. If the multi-factor authentication credentials are not valid, the authentication service may deny 814 the customer user's request to access the managed directory, even if the first set of credentials are valid. Alternatively, if the multi-factor authentication credentials are valid, the authentication service may establish 816 a connection between the customer user and the managed directory, thereby enabling the customer user to access the managed directory, as the first set of credentials and the multi-factor authentication credentials are both valid. The authentication service may issue the customer user client an access token, which may be utilized by the customer user client to access the managed directory.

Similar to the process described above in connection with FIG. 7, if the first set of credentials is not valid, the authentication service may forego accessing the RADIUS server provided by the managed directory service and may instead request 810 that the customer user provide the multi-factor authentication credentials to the authentication service. This may prevent the customer user from suspecting that the first set of credentials is invalid. Once the authentication service has received the multi-factor authentication credentials from the customer user, the authentication service may deny 814 the customer user's request to access the managed directory, as the first set of credentials are not valid. Before notifying the customer user that the request has been denied, the authentication service may delay informing the customer user by presenting the customer user with a standby status screen or other indication that the authentication service is processing the request. Further, the authentication service may not indicate which set of credentials were invalid when denying the customer user's request. This may further serve to prevent the customer user from suspecting which set of credentials are invalid.

Similar to the process 700 described above, the RADIUS server may return an "Access Challenge" response upon receiving the multi-factor authentication credentials and determining that these credentials are valid. In such cases, the RADIUS server may cause the authentication service to prompt the customer user for an additional set of credentials that may be used to authenticate the customer user. As another example, the RADIUS server may cause the authentication service to transmit an authentication code to a different customer user device, which the customer user may be required to provide through the original customer user's device to verify the identity of the customer user and enable access to the managed directory through the device.

It should be noted that in some embodiments, the process 800 may be performed using a different order of operations, additional operations and/or alternative operations. For instance, similar to the alternative operations described above in connection with FIG. 7, the authentication service may prompt the customer user for his/her multi-factor authentication credentials before requesting the first set of credentials from the customer user. Upon receiving the multi-factor authentication credentials, the authentication service may provide these multi-factor authentication credentials to the RADIUS server for authentication. Regardless of whether the RADIUS server determines that the multi-factor authentication credentials are valid or not, the authentication service may prompt the customer user to provide the first set of credentials. If the multi-factor authentication credentials are not valid, the authentication service may deny the customer user's request to access the managed directory without interacting with the on-premises customer network to determine whether the first set of credentials are valid. In other embodiments, the authentication service may receive the multi-factor authentication credentials and the first set of credentials from the customer user simultaneously, causing the authentication service to transmit both sets of credentials to the on-premises customer network and the RADIUS server for authentication.

Figure 9:
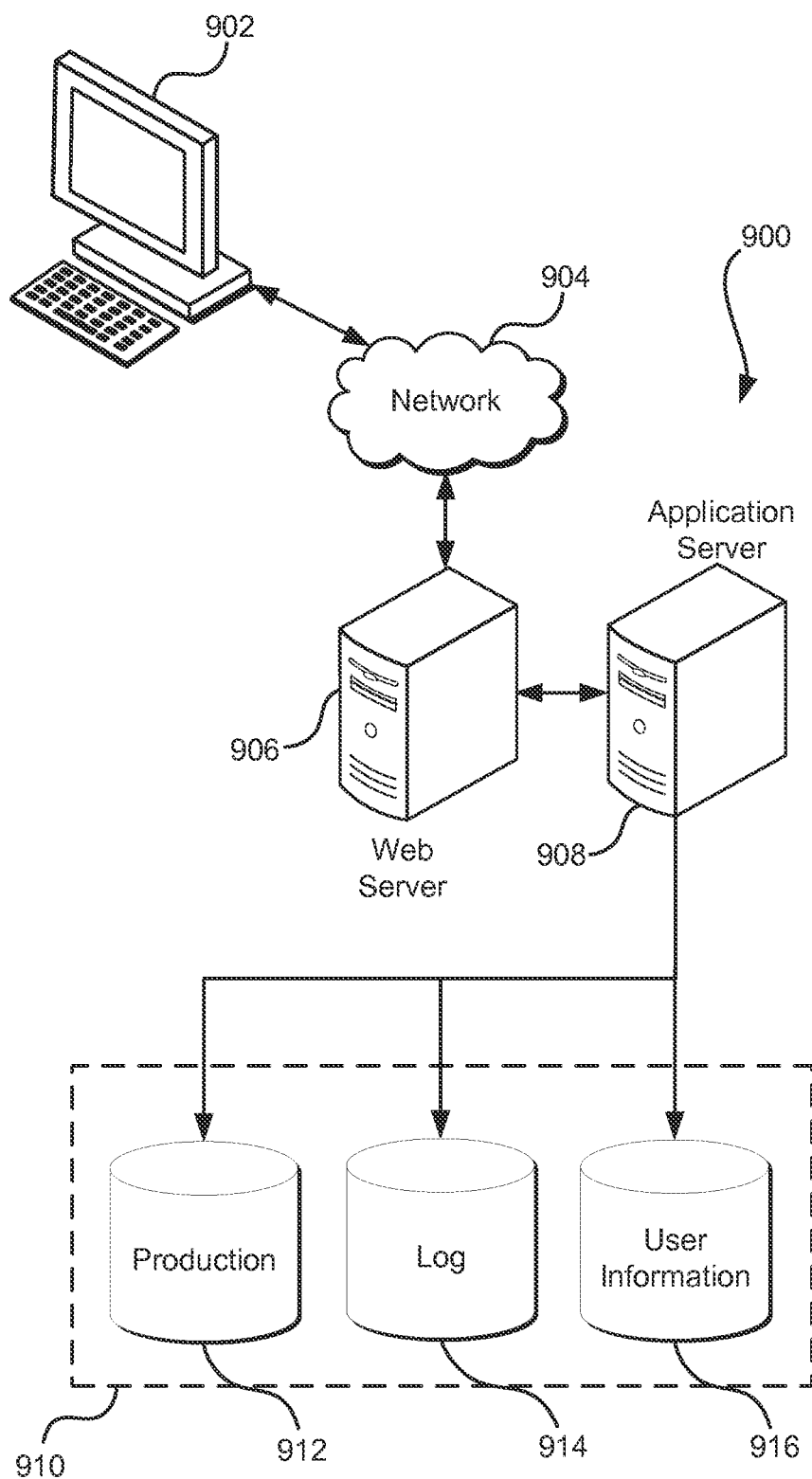
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
    obtaining, by an authentication service from a client device, a request to access a directory managed by a computer system, the request including a first set of credentials;
    determining, by the computer system that manages the directory, that the first set of credentials is valid;
    transmitting, by the authentication service to the client device, a second request to obtain a set of multi-factor authentication codes;
    obtaining, by the authentication service from the client device, the set of multi-factor authentication codes;
    as a result of the first set of credentials being valid and in response to obtaining the set of multi-factor authentication codes from the client device, providing, by the authentication service, the set of multi-factor authentication codes to a remote authentication dial in user service server for validation; and
    as a result of the remote authentication dial in user service server validating the set of multi-factor authentication codes, issuing, by the authentication service, an access token to the client device to allow access to the directory.

2. The computer-implemented method of claim 1, wherein:
    the remote authentication dial in user service server and the computer system are provided through an on-premises customer network; and
    the method further comprises:
        establishing an encrypted communications session between an agent operating within a network other than the on-premises customer network and the remote authentication dial in user service server; and
        accessing the remote authentication dial in user service server through the agent in order to provide the set of multi-factor authentication codes to the remote authentication dial in user service server for validation.

3. The computer-implemented method of claim 1, further comprising:
    obtaining, at the computer system, a request to enable multi-factor authentication for the directory, the request specifying a set of shared secret codes for establishing an encrypted communications channel with the remote authentication dial in user service server;
    identifying the remote authentication dial in user service server for validation of the set of multi-factor authentication codes; and
    providing the set of shared secret codes to the remote authentication dial in user service server to establish the encrypted communications channel through which the multi-factor authentication codes are transmitted.

4. The computer-implemented method of claim 1, wherein the remote authentication dial in user service server is operated and managed through the computer system.

5. A system, comprising:
    one or more processors; and
    memory storing thereon a set of instructions, that as a result of being performed by the one or more processors, cause the system to at least:
        obtain, from a first computer system, a request to access a directory managed by a second computer system operating within a network distinct from an on-premises customer network, the request including a first set of credentials;
        provide the first set of credentials to the second computer system to cause the second computer system to determine whether the first set of credentials are valid;
        obtain, from the first computer system, a second set of credentials, the second set of credentials being different from the first set of credentials;
        as a result of the first set of credentials being determined to be valid by the second computer system, provide the second set of credentials to an authentication server to determine whether the second set of credentials are valid; and as a result of the second set of credentials being determined to be valid by the authentication server, allow the first computer system to access the directory.

6. The system of claim 5, wherein the authentication server is a remote authentication dial in user service (RADIUS) that receives and transmits messages through a user datagram protocol (UDP) port.

7. The system of claim 5, wherein the authentication server is managed by the second computer system within the network distinct from the on-premises customer network.

8. The system of claim 5, wherein, as a result of the first set of credentials not being valid, the set of instructions further cause the system to:

in response to obtaining the second set of credentials, delay a notification that the request has been denied for a particular period of time; and as a result of the particular period of time being elapsed, transmit the notification.

9. The system of claim 5, wherein the set of instructions further cause the system to:

obtain a request to enable multi-factor authentication for the directory, the request specifying a set of shared secret codes to be used to establish an encrypted communications channel with the authentication server;

identify the authentication server to be used to validate the second set of credentials; and provide the set of shared secret codes to the authentication server to establish the encrypted communications channel through which the second set of credentials are transmitted.

10. The system of claim 9, wherein the set of instructions further cause the system to determine, based at least in part on characteristics of an interface used to provide one or more sets of credentials, whether to require multi-factor authentication.

11. The system of claim 5, wherein:

the authentication server is provided through the on-premises customer network; and the set of instructions further cause the system to:
establish an encrypted communications session with an agent of the second computer system, wherein access to the authentication server is performable through the agent; and access, through the agent, the authentication server to provide the second set of credentials to the authentication server to cause the authentication server to perform validation of the second set of credentials.

12. The system of claim 5, wherein:

the directory is managed and operated within the on-premises customer network;

the first set of credentials includes a set of domain credentials; and providing the first set of credentials to the second computer system cause the second computer system to use the set of domain credentials to establish an encrypted communications session with the on-premises customer network.

13. A non-transitory computer-readable storage medium storing thereon a set of instructions that, as a result of being performed by one or more processors of a computer system, cause the computer system to at least:

in response to obtaining, from a second computer system, a request to access a directory, the directory being managed by another computer system operating within a network distinct from an on-premises customer network, and a first set of credentials, provide the first set of credentials to the other computer system to authenticate the second computer system;

transmit, to the second computer system, a second request for a second set of credentials;

obtain, from the second computer system, the second set of credentials; and as a result of a determination, by the other computer system, that the first set of credentials is valid:
provide the second set of credentials to an authentication server to authenticate the second computer system using the second set of credentials; and as a result of the authentication server determining that the second set of credentials are valid and authenticating the second computer system, allow the second computer system to access the directory.

14. The non-transitory computer-readable storage medium of claim 13, wherein the set of instructions further cause the computer system to:

obtain a request to enable multi-factor authentication for the directory, the request specifying a set of shared secret codes to be utilized to establish an encrypted communications channel with the authentication server;

cause the authentication server to validate the set of shared secret codes in response to obtaining the second set of credentials to determine whether the encrypted communications channel can be established; and provide the set of shared secret codes to the authentication server.

15. The non-transitory computer-readable storage medium of claim 13, wherein the second set of credentials includes a set of shared secret codes that, as a result of being used by the authentication server, cause the authentication server to authenticate the second computer system.

16. The non-transitory computer-readable storage medium of claim 13, wherein:

the directory is managed and operated within the on-premises customer network;

the first set of credentials includes a set of domain credentials; and the set of instructions further cause the computer system to use the set of domain credentials to establish an encrypted communications session with the on-premises customer network.

17. The non-transitory computer-readable storage medium of claim 13, wherein the authentication server and the directory are operated and managed through the other computer system.

18. The non-transitory computer-readable storage medium of claim 13, wherein the set of instructions further cause the computer system to provide an OAuth token to the second computer system to allow the second computer system to use the OAuth token to access the directory.

19. The non-transitory computer-readable storage medium of claim 13, wherein the set of instructions further cause the computer system to, if the first set of credentials are invalid, deny the request after obtaining the second set of credentials and wait a particular period of time prior to denial of the request.

20. The non-transitory computer-readable storage medium of claim 13, wherein the authentication server is a RADIUS server comprising a UDP port to allow transmission and receipt of one or more messages by the authentication server.

\* \* \* \* \*